Feb. 13, 1945. J. S. THOMPSON 2,369,324
SYNCHRONIZED HYDRAULIC CONTROL VALVE
Filed Oct. 17, 1942 2 Sheets-Sheet 1
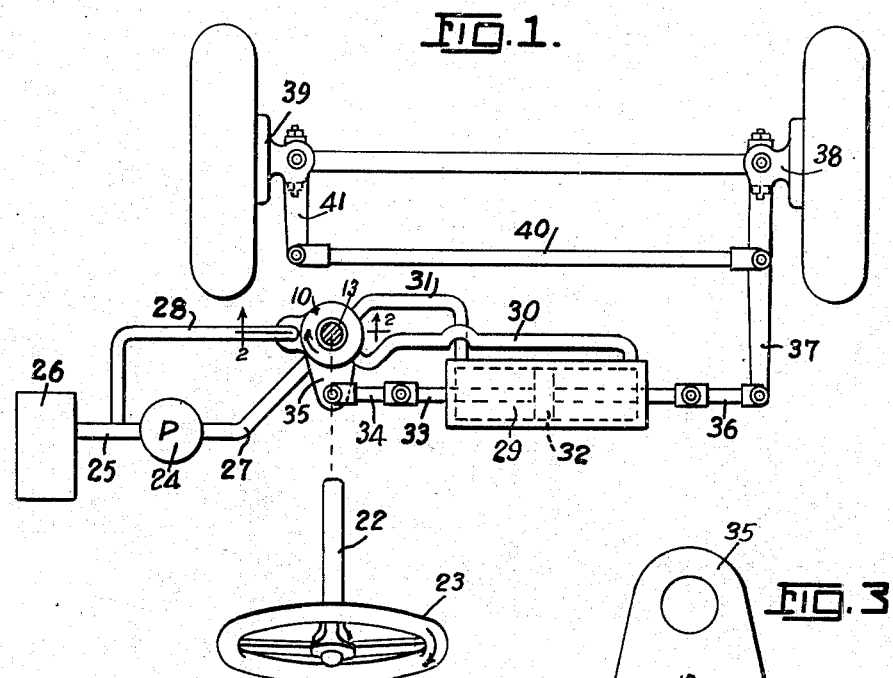
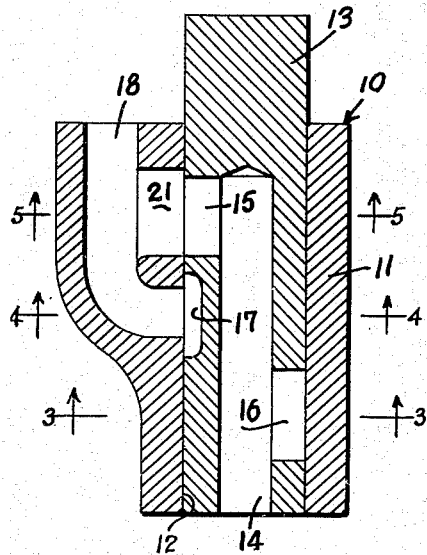
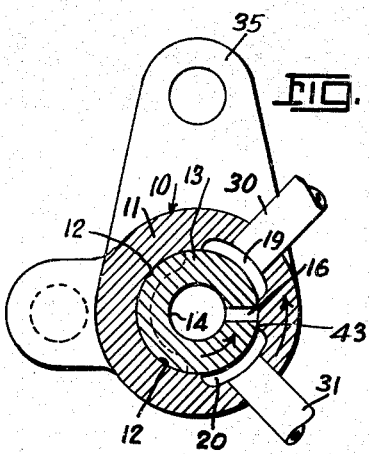
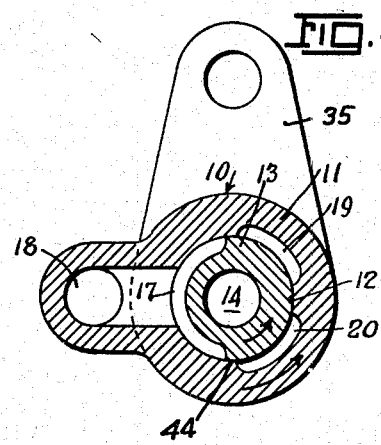
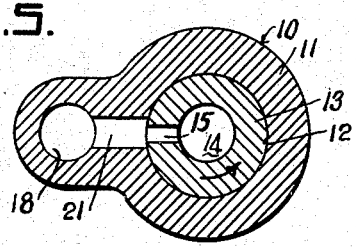
INVENTOR
JESSE S. THOMPSON,
BY
Toulmin & Toulmin
ATTORNEYS Feb. 13, 1945. J. S. THOMPSON 2,369,324
SYNCHRONIZED HYDRAULIC CONTROL VALVE
Filed Oct. 17, 1942 2 Sheets-Sheet 2
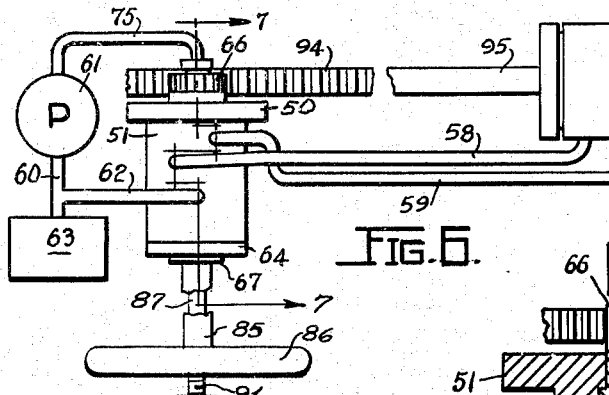
FIG.6.
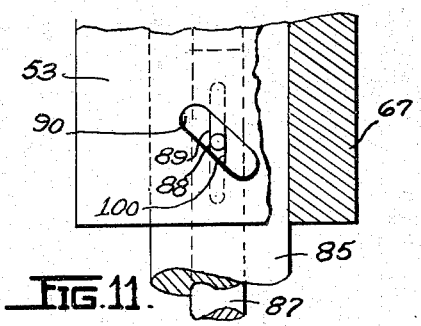
FIG.11.
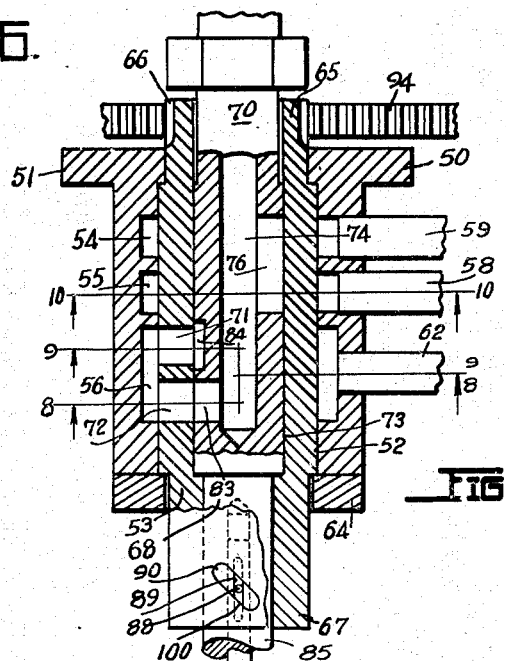
FIG.7.
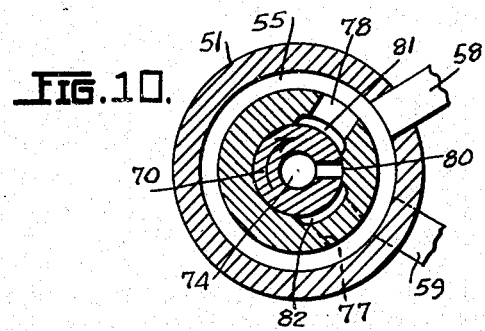
FIG.10.
FIG.9.
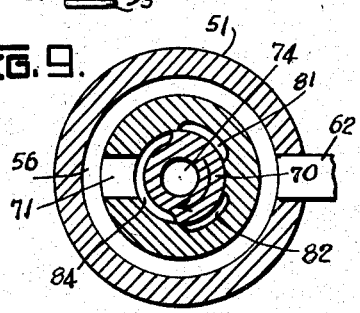
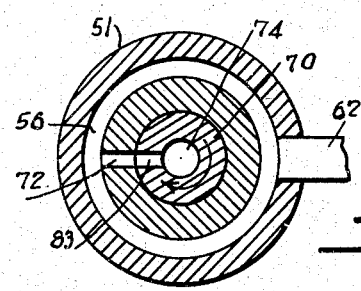
FIG.8.
INVENTOR
JESSE S. THOMPSON
BY
Toulmin & Toulmin
ATTORNEYS Patented Feb. 13, 1945

2,369,324

UNITED STATES PATENT OFFICE 2,369,324

SYNCHRONIZED HYDRAULIC CONTROL VALVE

Jesse S. Thompson, Marion, Ohio, assignor to The Huber Manufacturing Company, Marion, Ohio, a corporation of Ohio Application October 17, 1942, Serial No. 462,317

7 Claims. (Cl. 121—41)

This invention relates to hydraulic controls adapted to produce synchronized operation between a manually operated actuating mechanism and a hydraulic mechanism for producing power movement of a driven apparatus. The invention is particularly useful in connection with steering mechanisms to regulate the movement of a steering apparatus hydraulically and to synchronize the movement with the steering wheel.

An object of the invention is to provide a synchronized hydraulic control that will hydraulically follow up a movement of predetermined amount created by a manually actuated member.

Another object of the invention is to provide a hydraulic power system having a synchronized control valve therein that is operated both manually and hydraulically to move a hydraulic power mechanism in response to predetermined movements of the manually actuated member.

Another object of the invention is to provide a hydraulically actuated steering control mechanism.

Another object of the invention is to provide a control device for regulating the operation of a hydraulic motor wherein the control device initiates operation of the hydraulic motor by manual operation of the control device and the motor will then operate the control device to continue its complete stroke of operation until stopped by manual operation of the control device.

It is another object of the invention to provide a control device for a hydraulic motor that is constructed and arranged in the manner that the operation of the control device and the motor are synchronized to produce a predetermined movement of the motor in response to a predetermined manual movement of the control device, or the control device will initiate movement of the motor and the motor will continue its stroke until the control device is again manually actuated.

Another object of the invention is to provide a control valve for a hydraulic control system wherein one member of the control valve is operated manually to operate a hydraulic motor and the motor in turn operates a second member of the valve to stop movement of the motor.

Another object of the invention is to provide a control valve in a hydraulic system that has a rotor adapted to be rotated manually and a stator adapted to be power driven by the hydraulic mechanism supplied with fluid through the control valve.

Further objects and advantages will become apparent from the drawings and the following description.

In the drawings:

Figure 1 is a diagrammatic elevational view of the hydraulic control system of this invention as applied to steering mechanism for a vehicle.

Figure 2 is a longitudinal cross-sectional view of the control valve taken along line 2—2 of Figure 1.

Figure 3 is a transverse cross-sectional view of the control valve taken along line 3—3 Figure 2.

Figure 4 is a transverse cross-sectional view of the control valve taken along line 4—4 of Figure 2.

Figure 5 is a transverse cross-sectional view of the control valve taken along line 5—5 of Figure 2.

Figure 6 is a diagram of a control system using a modified form of control valve that is constructed and arranged to permit full stroke operation of the hydraulic motor after the motor has once been initiated in operation by the control valve.

Figure 7 is a longitudinal cross-sectional view of the control valve shown in Figure 6 taken along line 7—7 in Figure 6.

Figure 8 is a transverse cross-sectional view of the control valve taken along line 8—8 of Figure 7.

Figure 9 is a transverse cross-sectional view of the control valve taken along line 9—9 of Figure 7.

Figure 10 is a transverse cross-sectional view of the control valve taken along line 10—10 of Figure 7.

Figure 11 is an enlarged view of a portion of the device shown in Figure 7 illustrating the means for locking the rotor and stator together for rotation.

In this invention the control valve 10 disclosed in Figures 1 to 4 consists of a body or stator 11. The body or stator 11 is provided with a longitudinal bore 12 that receives a rotor 13.

The rotor 13 is provided with a longitudinal bore 14 and two transverse bores 15 and 16 that extend from the longitudinal bore 14. The bore 14 extends through one end of the rotor 13 and provides an inlet connection for high pressure fluid. The rotor 13 is also provided with a semi-annular groove 17 that communicates with an exhaust passage 18 provided in the stator 11.

The body or stator 11 is provided with two arcuate passageways 19 and 20 provided in the inner surface of the stator bore 12. These passages or ports 19 and 20 are adapted to communicate with opposite ends of a hydraulic motor for supplying fluid to the motor. A port or passage 21 is provided in the stator that is adapted to communicate with the bore 15 in the rotor 13 when the rotor is in neutral position so that the control valve is not supplying fluid to a hydraulic motor connected thereto.

As shown in Figure 1 the valve 10 has the rotor 13 thereof connected to the steering column 22 of a steering apparatus, the column 22 being provided with the usual steering wheel 23.

A fluid pump 24 is driven by any suitable source of power, which may be the engine of the vehicle upon which the device is placed. The pump 24 is provided with an inlet conduit 25 connected to a fluid supply reservoir 26 and has an outlet conduit 27 that connects with the longitudinal bore 14 in the rotor 13. A flexible return conduit 28 connects the passage 18 in the stator 11 with the inlet conduit 25 for the pump so that when the valve is positioned as shown in Figure 2 the pump will circulate fluid through the conduit 27, the bore 14, the passages 15 and 21, the passage 18 and return conduit 28, whereby the fluid is circulated in an idle circuit.

The outlet ports 19 and 20 of valve 10 are connected to opposite ends of a hydraulic motor 29 by means of the flexible conduits 30 and 31. The hydraulic motor is provided with a piston 32 therein having a plunger rod 33 extending from both ends of the motor. One end of the plunger rod 33 is connected by means of a link 34 to an arm extending from the body or stator 11, the link 34 being suitably pivoted to the arm 35 and the plunger 33 to permit swinging movement between the link and the parts to which it is connected.

The opposite end of the plunger rod 33 is connected by means of a link 36 to the steering arm 37 that is connected to the wheel 38, the arm 37 being connected to the opposite wheel 39 by means of a tie-rod 40 and an arm 41.

As shown in Figure 1 the control device of this invention is adapted to control the wheels of a vehicle for steering the same. However, it is to be understood that the control valve of this invention is not so limited but that it can control the operation of any hydraulic motor to regulate the movement of the motor and thus control the operation of any mechanism desired to be driven hydraulically. The disclosure of this invention is merely one explanation of the manner in which the control valve and control system can be used. It is also to be understood that the pump provided in the system can be of the variable delivery type, or can be a constant delivery pump having a by-pass associated therewith to relieve excess pressure when fluid stops in the discharge ram from the pump. Such constant delivery pumps, and variable delivery pumps for maintaining constant pressure in the discharge conduit, and relatively constant fluid flow through the discharge conduit are well known and many are available on the open market.

To operate the device the steering wheel is rotated in one direction or the other, but assuming the steering wheel is rotated in a clockwise direction as shown in Figure 1, the rotor 13 will be rotated in a clockwise direction, which becomes counter-clockwise in Figure 3 because of the inverted position of the figure. It is to be assumed of course that pressure fluid is standing in the center bore 14 of the rotor 13, or will be available as soon as the passage 15 moves away from the passage 21.

Referring now to Figures 3, 4, and 5, when the steering wheel was rotated in a clockwise direction the rotor 13 was rotated in the direction of the arrows as shown on these figures. Therefore, the port 16 was moved so that the bore 14 in the rotor 13 communicates with the passage 19 and thus with the conduit 30 to apply fluid pressure on the right hand end of the hydraulic motor 29. At the same time the semi-annular passage 17 communicates with the passage 20 and thus with the conduit 31 so that fluid in the left hand end of the hydraulic motor 29 can be exhausted through the conduit 28.

If this was the only function that was obtained the pressure fluid would be continuously supplied to the right hand end of the hydraulic motor 29. However, when the fluid enters the right hand end of the motor the plunger 33 is moved in a leftward direction therefore causing the stator 11 to be rotated in a clockwise direction so that the port 16 will again be closed when the land 43 covers the end of the port 16 as shown in Figure 3, the semi-annular passage 17 being closed from the port 20 by the land surface 44, whereby the plunger 33 will stop its leftward direction of movement. It may therefore be seen that the movement of the plunger 33 can be controlled by the synchronism of movement between the rotor 13 of the valve 10 and the stator 11 thereof, stator 11 always following the movement of the rotor 13 to stop the plunger in a predetermined position.

In Figures 6 to 10, inclusive, is shown a modified form of the invention wherein the control valve 50 is adapted to initiate operation of a hydraulic motor, after which initiation the hydraulic motor actuates the control valve to cause continuous flow of hydraulic fluid to the motor until it has completed its stroke, or until the control valve is subsequently actuated manually to stop operation of the hydraulic motor.

In this form of the invention the control valve 50 consists of a body 51 having an internal bore 52 adapted to receive what may be termed a stator 53. The body 51 is provided with three annular grooves 54, 55, and 56. The annular grooves 54 and 55 are connected to the hydraulic motor 57 by means of the conduits 58 and 59, the annular groove 56 being connected to the inlet conduit 60 of a pump 61 by means of a conduit 62. The inlet conduit 60 for the pump 61 is connected to a suitable fluid supply reservoir 63.

The stator 53 is rotatably disposed with the valve body 51 and is retained therein by means of a closure plate 64. The stator 53 has an end portion 65 extending from one end of the body 51 having a pinion 66 formed in the end thereof that engages a rack 94 carried upon the end of the plunger rod 95 extending from the hydraulic motor 57. The opposite end of the stator 53 has an end portion 67 extending from the body 51 that receives the shank 68 of a rotor 70. The stator 53 is provided with port passages 71 and 72 adapted to communicate with the annular groove 56.

The rotor 70 is rotatably disposed within bore 73 provided in the stator 53 and has a longitudinal bore 74 extending therethrough which provides a fluid pressure inlet for the valve 50 that is connected to the pump 61 by means of a conduit 75. The rotor 70 is provided with a port passage 76 adapted to communicate with the annular grooves 54 and 55 through the port passages 77 and 78 respectively according to the position of the passage 76 on one side or the other of the land 80 provided in the stator 53 between the passages 81 and 82. The rotor is also provided with a port passage 83 adapted to communicate with the passage 72 in the stator 53 to conduct fluid through the control valve from the inlet conduit 75 to the exhaust conduit 62 when the valve is in neutral position so that the pump will circulate fluid in a closed hydraulic circuit. The rotor is further provided with a semi-annular groove 84 adapted to communicate with the passage 71 to interconnect the passages 81 and 82 with the passage 71 during certain periods of operation of the valve to be hereinafter described.

The valve 50 thus far described will function identically in the same manner as the valve 10 previously described, the shank 68 of the rotor 70 being connected to a steering column 85 having a steering wheel 86 for manual control of the valve 50, and therefore a detailed description of the operation of the valve is not believed necessary.

However, the valve 50 is also capable of continuing the supply of hydraulic fluid to the motor 57 after the fluid supply has been initiated to the motor by the valve 50. To provide for this operation the steering column 85 is provided with an internal shaft 87 extending longitudinally therethrough that has a pin 88 secured thereto and extending through a slot 89 in the column 85 into cooperation with an angular slot 90 provided in the end portion 67 of the stator 53. The upper end of the shaft 87 is connected to a threaded member 91 that is in threaded engagement with the steering wheel 86 or the steering column 85 by means of a ball and socket joint 92. The threaded member 92 is provided with a hand wheel 93 for operating the same. It may thus be seen that rotation of the hand wheel 93 will cause axial movement of the threaded member 91 and thus cause axial movement of the shaft 87 to move the pin 88 into engagement with one side or the other of the slot 90 in the stator 53.

Under normal operation the rotation of the column 85 will rotate the rotor 70 relative to the stator 53 to initiate operation of the hydraulic motor 57, which thereby causes movement of the plunger 95 and the rack 94 to rotate the stator 53 to follow up the movement of the rotor 70 and thus stop the flow of fluid to the motor 57 after a predetermined movement of the plunger 95.

Since the motor 57 is to be operated so that the plunger 95 can proceed through a larger portion of its stroke without being halted by the normal following movement of the stator upon the rotor, the hand wheel 93 is rotated to axially move the shaft 87 and cause the pin 88 to engage the slot 90 and therefore rotate the rotor 70 relative to the stator 53, which at this time is immovable due to the trapped fluid in the motor 57, whereby to initiate operation of the motor 57. Assuming the hand wheel has been rotated to move the pin 88 into engagement with the upper surface 100 of the slot 90, the rotor 70 will be rotated in a clockwise direction whereby the inlet port 76 will communicate with the passages 82 and 77 to conduct fluid pressure to the conduit 59 and thereby apply fluid to the right hand end of the motor 57. The plunger 95 of the motor 57 will thus move in a leftward direction as viewed in Figure 6 to rotate the pinion 66 in a clockwise direction thereby retaining the surface 100 against the pin 88. Since the pin 88 had advanced the rotor 70 relative to the stator 53 the ports 76 and 82 cannot be thrown out of communication until the hand wheel 93 is grasped and rotated in the opposite direction to move the pin 88 in an upward direction toward the center of the slot 90, whereby the hydraulic fluid will be continuously applied to the right hand end of the hydraulic motor 57 and the stator and rotor will be rotated in synchronism until stopped by manual operation of the hand wheel 93.

While the forms of the apparatus disclosed herein constitute preferred forms of the invention, yet it is to be understood that the apparatus is capable of mechanical alteration without departing from the spirit of the invention and that all such modifications as fall within the scope of the appended claims are intended to be included herein.

Having thus fully described my invention, what I claim as new and desire to secure by Letters Patent is:

1. In a hydraulic control system, the combination of, a hydraulic motor, a source of fluid pressure for said motor, and a fluid flow control valve for regulating the flow of fluid from said source to said motor, said valve having a rotatable rotor disposed within a rotatable stator and passageways for interconnecting said source with said motor and said motor with exhaust, means for rotating said rotor to initiate flow of fluid to said motor, and auxiliary means for rotating said rotor relative to said stator to initiate flow of fluid to said motor, said auxiliary means maintaining an open fluid passage through said valve until subsequent operation thereof to cause restoration of the initial position of said stator relative to said rotor.

2. In a hydraulic control system, the combination of, a hydraulic motor, a source of fluid pressure for said motor, and a fluid flow control valve for regulating the flow of fluid from said source to said motor, said valve having a rotatable rotor disposed within a rotatable stator and passageways for interconnecting said source with said motor and said motor with exhaust, means for rotating said rotor to initiate flow of fluid to said motor, means connecting said stator with the actuated element of said motor for stopping flow of fluid to said motor upon predetermined actuation thereof, and auxiliary means for rotating said rotor relative to said stator to initiate flow of fluid to said motor, said auxiliary means maintaining an open fluid passage through said valve until subsequent operation thereof to cause restoration of the initial position of said stator relative to said rotor by said actuated element.

3. In a hydraulic control system, a hydraulic motor, having a plunger extending therefrom, a source of pressure fluid, and valve means connecting said source to said motor for regulating the flow of fluid thereto combining, a valve body, means connecting said body to said plunger, a rotor in said body, means for rotating said rotor relative to said body, passage means in said rotor and said body for connecting said source to said motor, whereby rotating of said rotor within said body initiates flow of fluid to said motor and actuation of said plunger by said flow of fluid rotates said body relative to said rotor to stop the flow of fluid to said motor, and auxiliary means for rotating said rotor relative to said body independently of said plunger to thereby establish fluid flow connection through said valve to said motor, said plunger rotating a part of said body and said rotor together upon actuation of said motor by establishment of said fluid flow until said last mentioned means is operated to rotate said rotor relative to said body to stop the fluid flow therethrough.

4. A hydraulic control system for synchronizing movements of a hydraulically actuated mechanism from movements of a manually operated mechanism combining a double acting hydraulic motor having plunger means connected to a hydraulically actuated mechanism, a source of fluid pressure for said motor, and fluid flow control valve means disposed between said source and said motor, said valve means including body means having means connecting the same to said plunger, rotor means rotatable in said body and connected to said manually operated mechanism, passage means in said rotor and said body means for connecting said source with opposite ends of said motor and said motor with exhaust, whereby rotation of said rotor establishes fluid connection between said source and one side of said motor to actuate said plunger means to thereby rotate a portion of said body means relative to said rotor to close said fluid connection, and auxiliary independent means for rotating said rotor relative to said body means to maintain the fluid connection throughout the stroke of said motor until said auxiliary means is operated to close the fluid connection.

5. A fluid flow control valve combining a body, a cylindrical bore in said body, a pair of recessed chamber means in said body operably connected to port means in said body for connecting said chamber means to opposite ends of a hydraulic motor, exhaust port means in said body, a rotor rotatably disposed in said bore, an axial inlet passage in said rotor adapted to be connected to a source of fluid pressure, a radial passage from said axial passage adapted to be selectively connected to either of said pair of chamber means for conducting fluid from said radial passage thereto, a second radial passage in said rotor for connecting said axial passage to said exhaust port, and a semi-annular passage in said rotor on the opposite side thereof from said first mentioned radial passage for selectively connecting either of said pair of chamber means with exhaust.

6. A fluid flow control valve combining a body, a cylindrical bore in said body, port means in said body adapted to be connected to opposite ends of a hydraulic motor, exhaust port means in said body, a rotor rotatably disposed in said bore, an axial inlet passage in said rotor adapted to be connected to a source of fluid pressure, a radial passage from said axial passage adapted to be selectively connected to said first mentioned port means, a radial passage adapted to be connected to said exhaust, a semi-annular passage in said rotor for selectively connecting said first mentioned port means with exhaust, and a body encircling said first mentioned body and having annular passageways therein communicating with said first mentioned port means and said exhaust passage.

7. A fluid flow control valve combining a body, a cylindrical bore in said body, port means in said body adapted to be connected to opposite ends of a hydraulic motor, exhaust port means in said body, a rotor rotatably disposed in said bore, an axial inlet passage in said rotor adapted to be connected to a source of fluid pressure, a radial passage from said axial passage adapted to be selectively connected to said first mentioned port means, a radial passage adapted to be connected to said exhaust, a semi-annular passage in said rotor for selectively connecting said first mentioned port means with exhaust, a body encircling said first mentioned body and having annular passageways therein communicating with said first mentioned port means and said exhaust passage, and means for rotating said first mentioned body within said second mentioned body to establish fluid flow between said first mentioned body and said rotor.

JESSE S. THOMPSON.